US012612325B2

(12) United States Patent
De Angelis et al.

(10) Patent No.: US 12,612,325 B2
(45) Date of Patent: Apr. 28, 2026

(54) GLASS MANUFACTURING APPARATUS

(71) Applicant: CORNING INCORPORATED,
Corning, NY (US)

(72) Inventors: Gilbert De Angelis, Lindley, NY (US);
Juan Camilo Isaza, Corning, NY (US)

(73) Assignee: CORNING INCORPORATED,
Corning, NY (US)

( * ) Notice: Subject to any disclaimer, the term of this
patent is extended or adjusted under 35
U.S.C. 154(b) by 342 days.

(21) Appl. No.: 18/026,162

(22) PCT Filed: Nov. 4, 2021

(86) PCT No.: PCT/US2021/058040
§ 371 (c)(1),
(2) Date: Mar. 14, 2023

(87) PCT Pub. No.: WO2022/103647
PCT Pub. Date: May 19, 2022

(65) Prior Publication Data
US 2023/0365451 A1 Nov. 16, 2023

Related U.S. Application Data

(60) Provisional application No. 63/113,009, filed on Nov.
12, 2020.

(51) Int. Cl.
*C03B 7/098* (2006.01)
*C03B 7/07* (2006.01)
(52) U.S. Cl.
CPC ................ *C03B 7/098* (2013.01); *C03B 7/07*
(2013.01)

(58) Field of Classification Search
None
See application file for complete search history.

(56) References Cited

U.S. PATENT DOCUMENTS

| | | | | | |
|---|---|---|---|---|---|
| 2,276,295 | A | * | 3/1942 | Ferguson | ................ C03B 7/098 |
| | | | | | 65/499 |
| 2008/0087046 | A1 | * | 4/2008 | Hirabara | ............... C03B 5/2252 |
| | | | | | 219/67 |
| 2008/0092597 | A1 | | 4/2008 | Itoh et al. | |

(Continued)

FOREIGN PATENT DOCUMENTS

| | | |
|---|---|---|
| CN | 203558961 U | 4/2014 |
| CN | 102583957 B | 7/2014 |

(Continued)

OTHER PUBLICATIONS

JP08217463A EPO Machine translation retrieved Mar. 16, 2026.
(Year: 2026).*

(Continued)

*Primary Examiner* — Lisa L Herring
(74) *Attorney, Agent, or Firm* — Kevin M. Able; F. Brock
Riggs

(57) ABSTRACT

A glass manufacturing apparatus is disclosed including a
vessel configured to convey molten glass, a conduit extend-
ing from the vessel, the conduit including a distal end with
a concave heating member joined thereto, a first electrical
flange joined to the conduit, and a second electrical flange
joined to the concave heating member. A method of pre-
venting devitrification of a molten glass forming material is
also described.

10 Claims, 7 Drawing Sheets

(56)        References Cited

U.S. PATENT DOCUMENTS

| | | | |
|---|---|---|---|
| 2010/0126224 A1 | 5/2010 | Lineman et al. | |
| 2011/0204039 A1* | 8/2011 | De Angelis | C03B 7/07 |
| | | | 219/438 |
| 2012/0125051 A1* | 5/2012 | Bergman | C03B 7/02 |
| | | | 65/324 |
| 2012/0266633 A1 | 10/2012 | De et al. | |
| 2020/0095152 A1* | 3/2020 | Kocatulum | C03B 17/064 |

FOREIGN PATENT DOCUMENTS

| | | | |
|---|---|---|---|
| CN | 203999310 U | 12/2014 | |
| CN | 107646022 A | 1/2018 | |
| CN | 110482837 A | 11/2019 | |
| DE | 102012104151 A1 | 11/2013 | |
| JP | 07-081944 A | 3/1995 | |
| JP | 08-217463 A | 8/1996 | |
| TW | 201706218 A | 2/2017 | |
| WO | 2013/167607 A1 | 11/2013 | |
| WO | 2014/011847 A1 | 1/2014 | |
| WO | 2015/026789 A1 | 2/2015 | |
| WO | 2016/200788 A2 | 12/2016 | |
| WO | WO-2018052869 A1 * | 3/2018 | C03B 7/084 |
| WO | WO-2020068570 A1 * | 4/2020 | C03B 7/07 |

OTHER PUBLICATIONS

International Search Report and Written Opinion of the International Searching Authority; PCT/US2021/058040; dated Feb. 22, 2022; pp. 11; Korean Patent Office.

Taiwanese Patent Application No. 110141795 , Office Action dated May 20, 2025, 2 pages (English Translation only), Taiwanese Patent Office.

Chinese Patent Application No. 202180087998.1, Office Action dated Jun. 25, 2025, 4 pages (English Translation only), Chinese Patent Office.

Chinese Patent Application No. 202180087998.1, Office Action dated Jan. 16, 2026, 4 pages (English Translation only), Chinese Patent Office.

* cited by examiner

GLASS MANUFACTURING APPARATUS

CROSS-REFERENCE TO RELATED APPLICATIONS

This is a national stage application under 35 U.S.C. § 371 of International Application No. PCT/US2021/058040 filed on Nov. 4, 2021, which claims the benefit of priority under 35 U.S.C. § 119 of U.S. Provisional Application Ser. No. 63/113,009 filed on Nov. 12, 2020, the contents of which are relied upon and incorporated herein by reference in their entirety.

FIELD

The present disclosure relates generally to glass manufacturing apparatus and, more particularly, to glass manufacturing apparatus for delivering a molten material such as molten glass, for example to a glass forming apparatus.

BACKGROUND

A glass making process can be divided into three stages: melting, where raw materials are heated to form a molten glass forming material; fining, where gaseous inclusions (e.g., bubbles) are removed from the molten glass forming material, and; thermal conditioning. After thermal conditioning, the molten glass forming material is delivered through an exit conduit to the forming apparatus. The molten material exiting the exit conduit should have a temperature profile that provides a proper forming viscosity to the molten glass forming material.

If the viscosity (e.g., temperature) of the molten glass forming material is not suitably maintained in the exit conduit, and particularly at the exit of the exit conduit, the molten glass forming material can devitrify. That is, devitrification can occur if the temperature of the molten glass forming material falls below the devitrification temperature for sufficient time.

SUMMARY

The following presents a simplified summary of the disclosure to provide a basic understanding of some embodiments described in the detailed description. These and other features, aspects and advantages are better understood when the following detailed description is read with reference to the accompanying drawings.

In some glass making processes, a molten glass forming material is delivered from a delivery system, for example from a delivery vessel, to a downstream process, such as a forming apparatus configured to form the molten material into a glass article. Typically, the molten glass forming material is delivered through a conduit, wherein the molten glass forming material is discharged from an exit aperture of the conduit. In various embodiments, a temperature, and therefore viscosity, of the molten glass forming material is maintained at a suitable temperature to facilitate homogeneous transport through the conduit. For example, FIGS. 1 and 2 illustrate a vertically oriented conduit 10 comprising an upper electrical flange 12 joined to conduit 10 and a lower electrical flange 14 joined to conduit 10 below upper electrical flange 12 at a discharge end 16 of the conduit from which molten glass forming material 18 flows. This can be done by supplying an electrical current through the conduit between the upper electrical flange 12 and the lower electrical flange 14, thereby heating conduit 10 between the upper electrical flange 12 and the lower electrical flange 14 by Joule heating, which in turn heats the molten glass forming material 18 in the conduit. Heating of the molten glass forming material by this method is often referred to as "direct" heating, in contrast to an indirect method using an external heat source, such as an electrical winding, positioned adjacent the conduit.

The electrical flanges are designed to supply large-magnitude electrical current, often ranging from several hundreds to several thousands of amperes, to the conduit. Electrical flanges are not intended to reach high temperatures and are configured with sufficient thickness to reduce their electrical resistance and limit their temperature during operation. In some cases, electrical flanges may be cooled by a cooling channel, e.g., a cooling tube, arranged around an outer periphery of the electrical flange (not shown). Accordingly, the electrical flanges, and in particular lower electrical flange 14 at or proximate the discharge end of the conduit, can act as a heat-dissipating fin, which can cool the discharge end of the conduit. Moreover, the location of lower electrical flange 14 at discharge end 16 can reduce Joule heating at the immediate discharge end. If the glass forming material at the discharge end 16 cools to a temperature less than the liquidus temperature of the glass forming material, and the glass forming material resides at the discharge end for a sufficient time, the glass forming material can undergo devitrification and form a crystalline mass 22 (hereinafter "devit"). If allowed to grow, devit 22 can separate from the conduit and contaminate the downstream glass forming material. For example, during operation of the glass making apparatus, molten glass forming material can migrate over edge surface 20 of the conduit and onto lower electrical flange 14. This migrated glass forming material on the edge surface and electrical flange 14 can crystallize to form devit 22, which can seed additional devit growth, even into an interior of the conduit.

Accordingly, a glass making apparatus is disclosed herein comprising a vessel configured to convey molten glass, a conduit extending downward from the vessel, the conduit comprising a distal end comprising a concave heating member joined thereto, a first electrical flange joined to the conduit and a second electrical flange joined to the concave heating member. In some embodiments, the concave heating member can comprise a truncated cone. The concave heating member can be orthogonally joined to the conduit. That is, the concave heating member may intersect the conduit orthogonally at the joint between the concave heating member and the conduit.

In various embodiments, the concave heating member comprises a minor end and a major end, and the second electrical flange is joined to an upper rim of the major end.

In embodiments, the second electrical flange can comprise a body portion with an inner edge defining an interior opening, the inner edge can be joined to the upper rim of the concave heating member about a circumference of the major end.

In some embodiments, the glass manufacturing apparatus may further comprise a third electrical flange joined to the conduit between the first electrical flange and the molten glass delivery vessel.

The glass manufacturing apparatus may further comprise a thermally conductive material disposed in a volume defined between the concave heating member and a wall of the conduit. The thermally conductive material can comprise a ceramic cement.

In some embodiments, a thickness of the conduit can be greater than a thickness T2 of the concave heating member.

In various embodiments, the conduit, the concave heating member, and the second electrical flange can comprise platinum, for example a platinum-rhodium alloy.

The glass manufacturing apparatus of any one of claims 1 to 10, wherein the conduit comprises a drainpipe of the vessel.

In various embodiments, the concave heating member can be an upwardly concave heating member.

In other embodiments, a glass manufacturing apparatus is described, comprising a molten glass delivery vessel, a conduit extending from the molten glass delivery vessel, the conduit comprising a proximal end joined to the molten glass delivery vessel and a distal end with a conical heating member extending from the distal end toward the molten glass delivery vessel and an electrical flange joined to the conical heating member.

The glass manufacturing apparatus may further comprise a ceramic cement disposed in a volume defined between the conical heating member and a wall of the conduit.

In various embodiments, the conduit, the conical heating member, and the second electrical flange can comprise platinum, for example a platinum-rhodium alloy.

In some embodiments, the conical heating member can comprise an arcuate neck portion orthogonally joined to the distal end.

In some embodiments, a thickness $T1$ of the conduit is greater than a thickness $T2$ of the conical heating member.

In still other embodiments, a glass manufacturing apparatus is disclosed, comprising a vessel configured to convey molten glass, a conduit extending from and in fluid communication with the vessel, the conduit comprising a proximal end joined to the vessel and a distal end opposite to and spaced apart from the proximal end, a concave heating member joined to the conduit, the concave heating member comprising a major end and a minor end, and extending around at least a portion of a length of the conduit and an electrical flange joined to the concave heating member at the major end thereof. For example, the minor end of the concave heating member can be is joined to the conduit.

In some embodiments, the minor end comprises an arcuate neck portion with a curvature curving in a direction of the conduit. For example, the arcuate neck portion can be orthogonally joined to the conduit.

In some embodiments, the minor end of the concave heating member is joined to the distal end of the conduit.

In some embodiments, a thickness $T1$ of the conduit is greater than a thickness $T2$ of the concave heating member.

In various embodiments, the conduit, the concave heating member, and the electrical flange comprise platinum, for example a platinum-rhodium alloy.

In some embodiments, the concave heating member can be an upwardly concave heating member.

In yet other embodiments, a method of preventing devitrification of a molten glass forming material is disclosed, comprising flowing the molten glass forming material through a conduit, the conduit comprising a concave heating member joined to the conduit and extending around at least a portion of a length of the conduit, establishing an electrical current in the conduit and the concave heating member between a first electrical flange joined to the conduit and a second electrical flange joined to the concave heating member, the concave heating member conductively heating the at least a portion of the length of the conduit. The concave heating member comprises a major end including a first diameter $d1$ and a minor end opposite the major end. The minor end can comprise a second diameter $d2$ less than $d1$.

In some embodiments, the minor end can comprise an arcuate neck portion including a curvature curving in a direction toward the conduit and orthogonally joined to the conduit.

In some embodiments, the concave heating member can be joined to a distal end of the conduit.

In some embodiments, the concave heating member can be an upwardly concave heating member.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
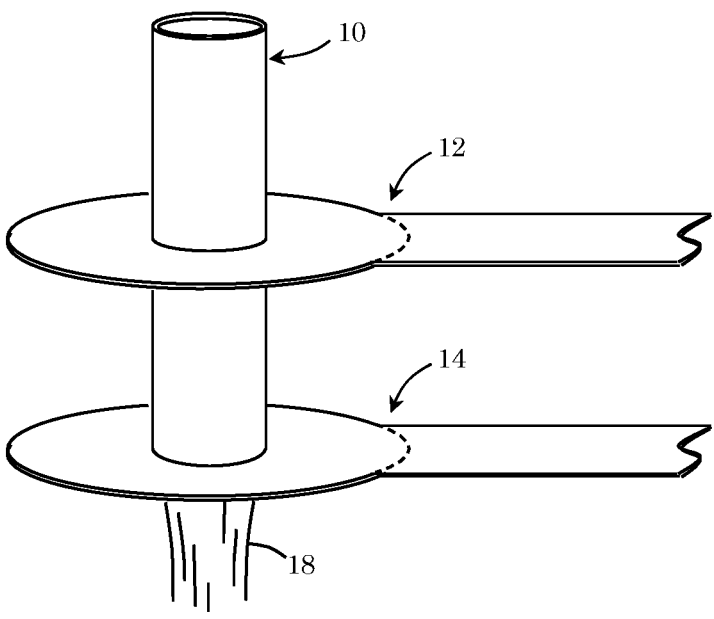
FIG. 1 is a schematic view of a conduit and a pair of electrical flanges joined thereto for direct heating of a molten glass forming material flowing through the conduit.
Figure 2:
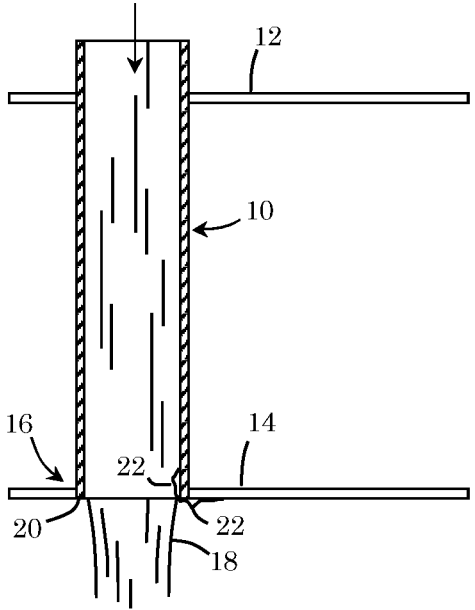
FIG. 2 is a cross-sectional view of the conduit and electrical flanges of FIG. 1.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Ranges can be expressed herein as from "about" one particular value, and/or to "about" another particular value. When such a range is expressed, another embodiment includes from the one particular value to the other particular value. Similarly, when values are expressed as approximations by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including matters of logic with respect to arrangement of steps, operational flow, order of components, or orientation of components; plain meaning derived from grammatical organization or punctuation, and the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the term "electrically connected," "electrically connecting," and variations thereof, mean connected by way of an electrical conductor, e.g., metallic conductor, but not including a molten material (e.g., molten glass). A first element electrically connected to a second element can include additional elements between the first element and the second element such that the additional elements are also electrically connected to the first element and the second element. That is, a first element electrically connected to a second element is not to be construed as precluding the presence of additional conducting elements in the connection. Typically, such electrical conductors can comprise metallic wiring or cabling, bus bars, and the like, but are not limited thereto. The electrical connection may further include other components, including but not limited to electrical connectors (e.g., plugs, tabs, lugs, bolts, etc.) that facilitate connection between components, electrical control devices such as electrical current and/or voltage controllers, electrical current and/or voltage measurement devices, and the like.

As used herein, "refractory" refers to non-metallic materials having chemical and physical properties making them applicable for structures, or as components of systems, that are exposed to environments above 538° C.

As used herein, "conical" includes right circular cones, oblique circular cones, and truncated cones.

Unless otherwise indicated, drawings are not to scale.

Figure 3:
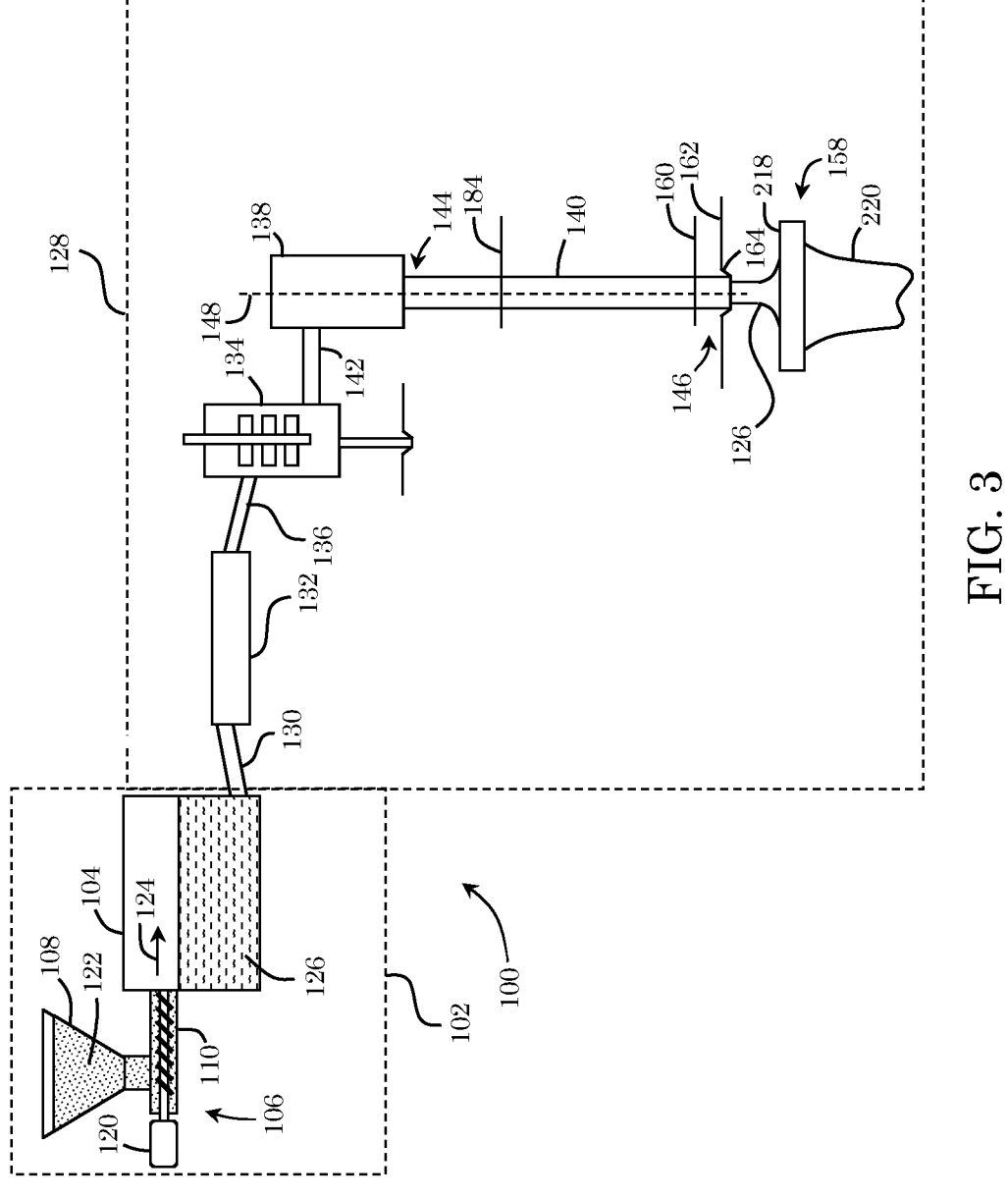
FIG. 3 is an exemplary glass forming apparatus according to embodiments disclosed herein including a delivery vessel and an exit conduit extending therefrom, with electrical flanges configured to establish an electrical current in the exit conduit.

Shown in FIG. 3 is an exemplary glass manufacturing apparatus 100. In some embodiments, the glass manufacturing apparatus 100 can comprise a glass melting furnace 102 including a melting vessel 104. In addition to melting vessel 104, glass melting furnace 102 can optionally include one or more additional components such as heating elements (e.g., combustion burners and/or electrodes) configured to heat raw material and convert the raw material into molten glass. For example, melting vessel 104 may be an electrically boosted melting vessel, wherein energy is added to the raw material through both combustion burners and by direct heating, wherein an electrical current is passed through the raw material, the electrical current thereby adding energy via Joule heating of the raw material.

In further embodiments, glass melting furnace 102 can include other thermal management devices (e.g., isolation components) that reduce heat loss from the melting vessel. In still further embodiments, glass melting furnace 102 can include electronic and/or electromechanical devices that facilitate melting of the raw material into a glass melt. Glass melting furnace 102 can include support structures (e.g., support chassis, support members, etc.) or other components.

Melting vessel 104 can be formed from a refractory material, such as a refractory ceramic material, for example a refractory ceramic material comprising alumina and/or zirconia, although the refractory ceramic material can comprise other refractory materials, such as yttrium (e.g., yttria, yttria-stabilized zirconia, yttrium phosphate), zircon (Zr-SiO$_4$) or alumina-zirconia-silica or even chrome oxide, used either alternatively or in any combination. In some examples, melting vessel 104 may be constructed from refractory ceramic bricks.

In some embodiments, glass melting furnace 102 can be incorporated as a component of a glass manufacturing apparatus configured to fabricate a glass article, for example a glass ribbon, although in further embodiments, the glass manufacturing apparatus can be configured to form other glass articles without limitation, such as glass rods, glass tubes, glass envelopes (for example, glass envelopes for lighting devices, e.g., light bulbs) and glass lenses, although many other glass articles are contemplated. In some examples, the melting furnace may be included in a glass manufacturing apparatus comprising a slot draw apparatus, a float bath apparatus, a down-draw apparatus (e.g., a fusion down draw apparatus), an up-draw apparatus, a pressing apparatus, a rolling apparatus, a tube drawing apparatus or any other glass manufacturing apparatus that would benefit from the present disclosure. By way of example, FIG. 3 schematically illustrates glass melting furnace 102 as a component of a fusion down-draw style glass manufacturing apparatus 100 for fusion drawing a glass ribbon for subsequent processing into individual glass sheets or rolling the glass ribbon onto a spool. As used herein, fusion drawing comprises flowing molten glass over side surfaces of a forming body, wherein the resulting streams of molten material join, or "fuse," at the bottom of the forming body.

Glass manufacturing apparatus 100 can optionally include an upstream glass manufacturing apparatus 106 positioned upstream of melting vessel 104. In some examples, a portion of, or the entire upstream glass manufacturing apparatus 106, can be incorporated as part of the glass melting furnace 102.

As shown in the embodiment illustrated in FIG. 3, upstream glass manufacturing apparatus 106 can include a raw material storage bin 108, a raw material delivery device 110, for example an auger or screw feeder, and a motor 120 connected to raw material delivery device 110. Raw material storage bin 108 can be configured to store a quantity of raw material 122 that can be fed into melting vessel 104 through one or more feed ports, as indicated by arrow 124. Raw material 122 typically comprises one or more glass forming metal oxides and one or more modifying agents. In some examples, raw material delivery device 110 can be powered by motor 120 to deliver a predetermined amount of raw material 122 from raw material storage bin 108 to melting vessel 104. In further examples, motor 120 can power raw material delivery device 110 to introduce raw material 122 at a controlled rate based on a level of molten material sensed downstream from melting vessel 104 relative to a flow direction of the molten material. Raw material 122 within melting vessel 104 can thereafter be heated to form molten glass forming material 126. Typically, in an initial melting step, raw material is added to the melting vessel as particulate, for example as various "sands" or powders. Raw material 122 can also include scrap glass (cullet) from previous melting and/or forming operations. Combustion burners are typically used to begin the melting process. In an electrically boosted melting process, once the electrical resistance of the raw material is sufficiently reduced, electric heating can begin by developing an electrical potential between electrodes positioned in contact with the raw material, thereby driving an electrical current through the raw material, the raw material typically entering, or in, a molten state. As used herein, the resultant molten glass forming material is referred to as molten glass 126.

Glass manufacturing apparatus 100 can optionally include a downstream glass manufacturing apparatus 128 positioned downstream of glass melting furnace 102 relative to a flow direction of molten glass 126. In some examples, a portion of downstream glass manufacturing apparatus 128 may be incorporated as part of glass melting furnace 102. However, in some instances, a first connecting conduit 130 discussed below, or other portions of downstream glass manufacturing apparatus 128, can be incorporated as part of glass melting furnace 102.

Downstream glass manufacturing apparatus 128 can include a first conditioning (e.g., processing) chamber, such as fining vessel 132, located downstream from melting vessel 104 and coupled to melting vessel 104 by way of the above-referenced first connecting conduit 130. In some examples, molten glass 126 may be gravity fed from melting vessel 104 to fining vessel 132 by way of first connecting conduit 130. For instance, gravity may drive molten glass 126 through an interior pathway of first connecting conduit 130 from melting vessel 104 to fining vessel 132. Accordingly, first connecting conduit 130 provides a flow path for molten glass 126 from melting vessel 104 to fining vessel 132. It should be understood, however, that other conditioning chambers may be positioned downstream of melting vessel 104, for example between melting vessel 104 and fining vessel 132. In some embodiments, a conditioning chamber can be employed between the melting vessel and the fining vessel. For example, molten glass from a primary melting vessel can be further heated in a secondary conditioning vessel or cooled in the secondary conditioning vessel to a temperature lower than the temperature of the molten glass in the primary melting vessel before entering the fining chamber.

Gaseous inclusions may be removed from molten glass 126 by various techniques. For example, raw material 122 may include multivalent compounds (e.g., fining agents) such as tin oxide that undergo a chemical reduction reaction when heated and release oxygen. Other suitable fining agents include without limitation arsenic, antimony, iron and cerium, although the use of arsenic and/or antimony may be discouraged for environmental reasons. Fining vessel 132 can be heated, for example to a temperature greater than the melting vessel temperature, thereby heating the fining agent. Oxygen produced by the temperature-induced chemical reduction of one or more fining agents included in the molten glass rise through the molten glass in the fining vessel and can coalesce or diffuse into bubbles produced during the melting process. The enlarged gas bubbles with increased buoyancy then rise to a free surface of the molten glass in the fining vessel and can thereafter be vented from the fining vessel.

The downstream glass manufacturing apparatus 128 can further include another conditioning chamber, such as mixing apparatus 134, for example a stirring vessel, for mixing the molten glass that flows downstream from fining vessel 132. Mixing apparatus 134 can be used to provide a homogenous glass melt composition, thereby reducing chemical or thermal inhomogeneities that may otherwise exist within the molten glass exiting the fining chamber. As shown, fining vessel 132 may be coupled to mixing apparatus 134 by way of a second connecting conduit 136. In some embodiments, molten glass 126 can be gravity fed from fining vessel 132 to mixing apparatus 134 by way of second connecting conduit 136. For instance, gravity can drive molten glass 126 through an interior pathway of second connecting conduit 136 from fining vessel 132 to mixing apparatus 134. Typically, the molten glass in mixing apparatus 134 includes a free surface, with a free volume extending between the free surface and a top of the mixing apparatus. While mixing apparatus 134 is shown downstream of fining vessel 132 relative to a flow direction of the molten glass, mixing apparatus 134 may be positioned upstream from fining vessel 132 in other embodiments. In some embodiments, downstream glass manufacturing apparatus 128 may include multiple mixing apparatus, for example a mixing apparatus upstream from fining vessel 132 and a mixing apparatus downstream from fining vessel 132. When used, multiple mixing apparatus may be of the same design, or they may be of a different design from one another. In some embodiments, one or more of the vessels and/or conduits can include static mixing vanes positioned therein to promote mixing and subsequent homogenization of the molten material.

Downstream glass manufacturing apparatus 128 can further include still another conditioning chamber such as delivery vessel 138 located downstream from mixing apparatus 134. Delivery vessel 138 can condition molten glass 126 to be fed into a downstream forming device. For instance, delivery vessel 138 can act as an accumulator and/or flow controller to adjust and/or provide a consistent flow of molten glass 126 to downstream processes by way of an exit conduit, hereinafter downcomer 140. Molten glass 126 in delivery vessel 138 can, in some embodiments, include a free surface, wherein a free volume extends upward from the free surface to a top of the delivery vessel. As shown, mixing apparatus 134 can be coupled to delivery vessel 138 by way of third connecting conduit 142. In some examples, molten glass 126 can be gravity fed from mixing apparatus 134 to delivery vessel 138 by way of third connecting conduit 142. For instance, gravity can drive molten glass 126 through an interior pathway of third connecting conduit 142 from mixing apparatus 134 to delivery vessel 138.

Figure 4:
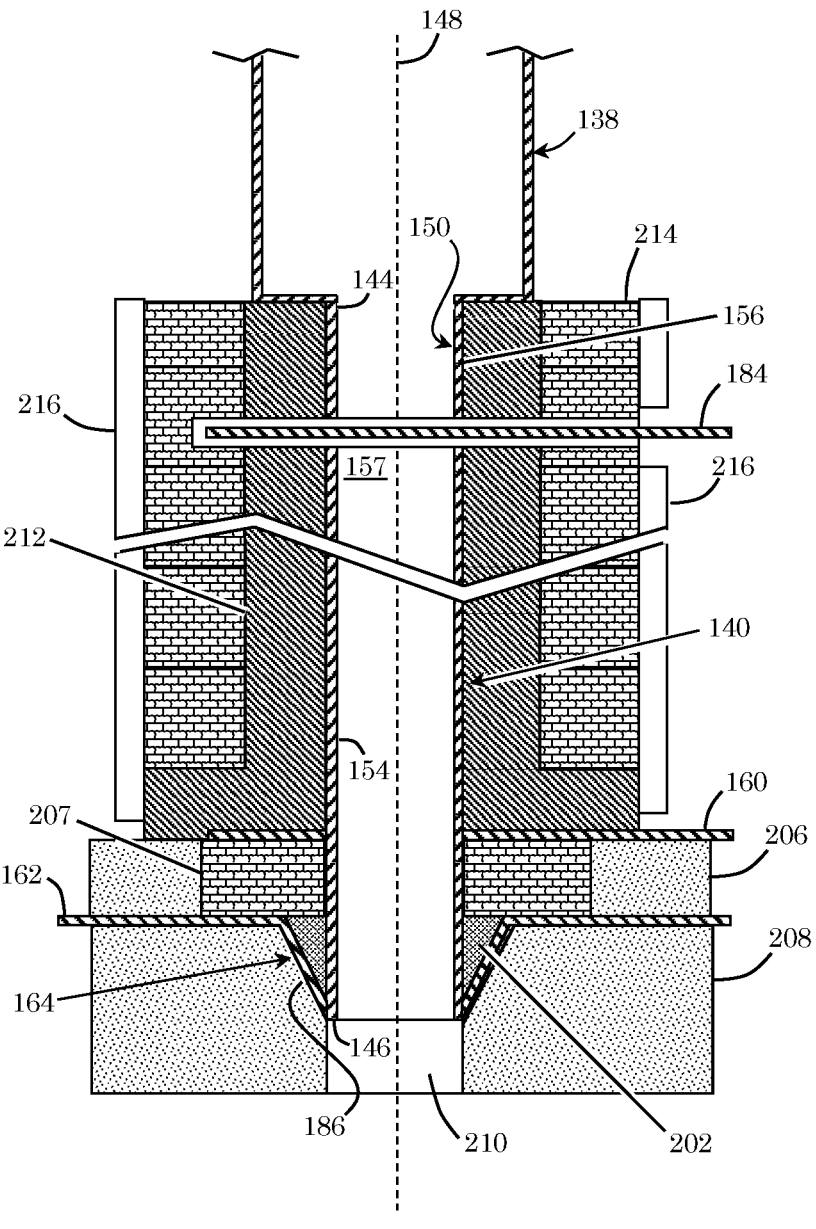
FIG. 4 is an elevational, cross-sectional view of the exit conduit of FIG. 1 showing a concave heating member attached to a distal end of the exit conduit.
Figure 5:
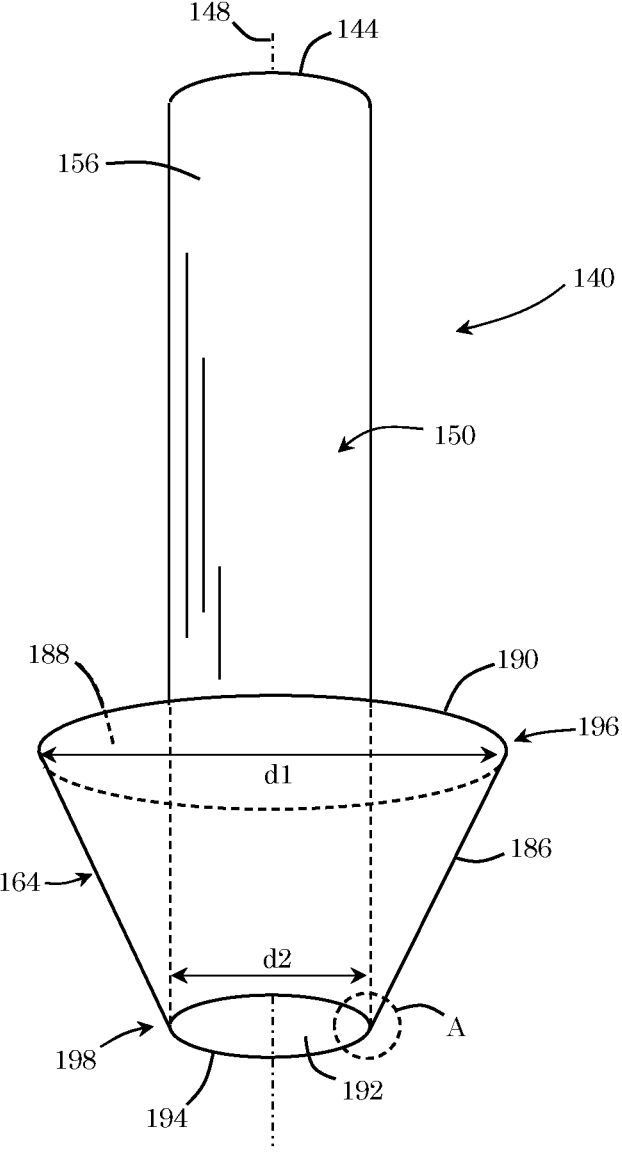
FIG. 5 is a perspective view of at least a portion of the exit conduit of FIG. 2 showing the concave heating member.

Referring now to FIGS. 4 and 5, downcomer 140 comprises a proximal end 144 coupled to delivery vessel 138 and in fluid communication therewith, and a distal end 146 opposite proximal end 144 and spaced apart therefrom along a central longitudinal axis 148 of downcomer 140. A wall 150 of downcomer 140 comprises an inner surface 154 and an outer surface 156, wall 150 defining an interior pathway 157 extending between proximal end 144 and distal end 146. Gravity can drive molten glass 126 through interior pathway 157 from delivery vessel 138 to distal end 146 of downcomer 140, whereupon the molten glass can be delivered from distal end 146 to forming apparatus 158. For example, molten glass 126 can be delivered to a down-draw glass forming apparatus (e.g., a slot draw glass forming apparatus, an overflow down-draw), a float-type glass forming apparatus, or a rolling glass forming apparatus although in further embodiments, molten glass 126 can be delivered to any other glass forming apparatus as are known in the art.

As shown in FIG. 4, downcomer 140 is joined to a first electrical flange 160 and electrically connected to a second electrical flange 162 via a concave heating member 164, first electrical flange 160 and second electrical flange 162 configured to provide an electrical current to downcomer 140. For example, an electrical current can be established in wall 150 between first electrical flange 160 and second electrical flange 162 that heats wall 150 and thereby heats and/or maintains a temperature of the molten glass flowing through the portion of downcomer 140 between first electrical flange 160 and second electrical flange 162. First electrical flange 160 is positioned upstream of second electrical flange 162, although in further embodiments, first electrical flange can be joined to delivery vessel 38.

Figure 6:
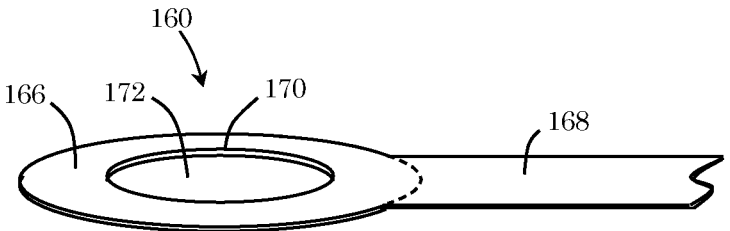
FIG. 6 is a perspective view of an exemplary first electrical flange.

Referring to FIG. 6, first electrical flange 160 comprises a first body portion 166 and a first electrode portion 168 extending from first body portion 166. First body portion 166 comprises an inner edge 170 defining an opening 172 through first body portion 166.

Figure 7:
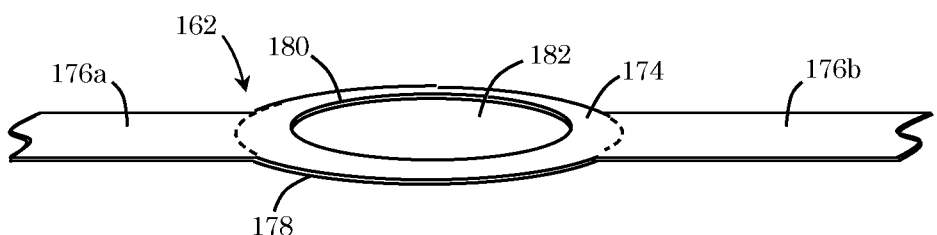
FIG. 7 is a perspective view of an exemplary second electrical flange.

Turning to FIG. 7, second electrical flange 162 includes a second body portion 174 and a first electrode portion 176a. In some embodiments, such as the illustrated embodiment, second electrical flange 162 may comprise a second electrode portion 176b, wherein first electrode portion 176a is arranged on second body portion 174 opposite second electrode portion 176b such that electrode portions 176a and 176b are 180 degrees apart. Second body portion 174 further comprises an inner edge 180 defining an opening 182 through second body portion 174 and an outer peripheral edge 178 about a circumference of the body portion. In various embodiments, first body portion 166 and/or second body portion 174 can be planar or substantially planar.

While not shown, in further embodiments, first electrical flange may comprise a second electrode portion opposite first electrode portion 168. Similarly, second electrical flange 162 may comprises one electrode portion in a manner shown for first electrical flange 160. The use of multiple electrode portions, for example opposing electrode portions, can make the current delivered to the component to which the electrical flange is joined more uniform about a circumference of the component at the joint.

In some embodiments, one or more additional electrical flanges can be joined to downcomer 140 between first electrical flange 160 and delivery vessel 138. For example, FIGS. 3 and 4 illustrate a third electrical flange 184 attached to downcomer 140 and positioned above first electrical flange 160, e.g., between first electrical flange 160 and delivery vessel 138. Third electrical flange 184 can be similar to or identical to first electrical flange 160 according to some embodiments. Third electrical flange 184 can have a single electrode portion or multiple electrode portions. Each electrical flange can be electrically connected to an electrical power supply (not shown) and configured to deliver an electrical current to the electrical flanges. The electrical power supply can be a local electrical power grid, e.g., an electrical substation, or a separate electrical generator.

Returning to FIGS. 4 and 5, in some embodiments concave heating member 164 can extend upwardly from distal end 146 of downcomer 140. That is, concave heating member 164 can be a concave heating member. Concave heating member 164 can comprise skirt 186 comprising a circular cross-section in a plane orthogonal to longitudinal axis 148, although in further embodiments, heating member 164 can have a non-circular cross-sectional shape. An upper opening 188 is defined by an upper rim 190 of concave heating member 164, upper rim 190 having a first diameter d1. Concave heating member 164 further comprises a second, lower opening 192 defined by a second, lower rim 194, lower rim 194 having a second diameter d2 less than first diameter d1. The end of concave heating member 164 having the largest-sized opening, i.e., upper opening 188, is defined as major end 196, whereas the end of upwardly concave heating member 164 with the smaller opening, i.e., second opening 192, is defined as minor end 198. In some embodiments, concave heating member 164 can be conical, e.g., comprise a conical skirt 186. In various embodiments, minor end 198 of upwardly concave heating member 164 can include an arcuate neck portion 200 (see FIG. 8), wherein neck portion 200 comprises a curvature in the direction of longitudinal axis 148. That is, arcuate neck portion 200 curves inward toward downcomer 140 and comprises lower rim 194.

Inner edge 180 of second electrical flange 162 is attached to upper rim 190 of concave heating member 164, such as by welding, and lower rim 194 of concave heating member 164 is attached to or proximate distal end 146 of downcomer 140. Accordingly, a cup-shaped volume with a closed bottom is formed between concave heating member 164 and wall 150.

Figure 8:
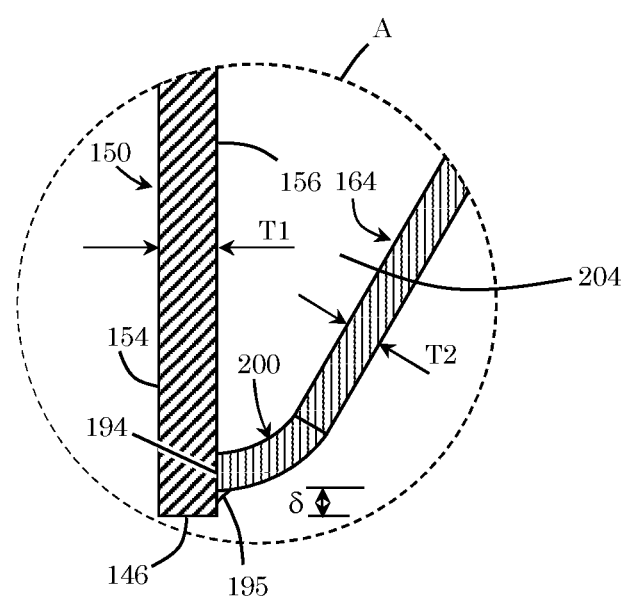
FIG. 8 is a cross-sectional view of a portion of the distal end of the exit conduit and the concave heating member showing the skirt and the arcuate neck portion orthogonally joined to the exit conduit.

In some embodiments, best seen in FIG. 8 showing region A of FIG. 5, lower rim 194 may be attached a short distance 8 above distal end 146 to allow sufficient clearance between a weld 195 used to join lower rim 194 to wall 150. That is, welding operations to join lower rim 194 directly to downcomer 140 at distal end 146 can produce deformation of distal end 146 that may disrupt the flow of molten glass from distal end 146. Accordingly, lower rim 194 of concave heating member 164 may be moved slightly above distal end 146, for example wherein δ is in a range from about 1 millimeter to about 3 millimeters, such as between about 1 millimeter to about 1.5 millimeters, or in a range greater than zero millimeters but equal to or less than about 1 millimeter. Thus, as used herein, reference to the concave heating member being joined to distal end 146 of the conduit includes a length of the conduit within 3 mm of the distal end. Arcuate neck portion 200 can be arranged such that the arcuate neck portion is orthogonal to wall 150 where lower rim 194 intersects wall 150. An orthogonal intersection of concave heating member 164 to downcomer 140 aids in maintaining a consistent thickness of concave heating member 164 and avoids electrical resistance changes that may occur within concave heating member 164. Put another way, in various embodiments, wall 150 of downcomer 140 can comprise a substantially uniform thickness T1. On the other hand, concave heating member 164 can have a thickness T2 that is equal to or less than T1. The current density through a conductor is a function of the magnitude of the electrical current and the cross-sectional area of the conductor. The resistance of downcomer 140 is proportional to the length of the conductor divided by the cross-sectional area. To wit, the electrical resistance R of downcomer 140, or a selected portion thereof, is the length L of the downcomer, or the selected portion thereof, divided by the cumulative cross-sectional area A in a plane perpendicular to longitudinal axis 148 ($R \propto L/A$) assuming a uniform thickness. The electrical current I in downcomer 140 is I=E/R, where E is the voltage across length L and R is the electrical resistance. It should be apparent that d1 is greater than d2 at each cross-section of upwardly concave heating member 164 by a plane orthogonal to longitudinal axis 148. Indeed, as cross-sections of concave heating member 164 approach upper rim 190, d2 increases. If a thickness T2 of concave heating member 164 is greater than T1, the cross-sectional area A2 of concave heating member 164 at any cross-section thereof is greater than the cross-sectional area A1 of the corresponding cross-section of downcomer 140. Thus, the current density in concave heating member 164, and the thermal power generated, by concave heating member would be reduced. Accordingly, in various embodiments, T2 of skirt 186 is less than the thickness T1 of wall 150, wherein both thickness T1 and T2 are measured as the shortest distance between opposing surfaces of the corresponding component (e.g., the distance between the opposing surfaces along a line orthogonal to the opposing surfaces, for example the orthogonal distance between inner surface 154 and outer surface 156 of downcomer 140). If concave heating member 164 intersects downcomer 140 at an angle other than 90 degrees, the cross-sectional area of the concave heating member at the intersection with downcomer 140 will differ from the cross-sectional area of the concave heating member elsewhere in the concave heating member.

Figure 9:
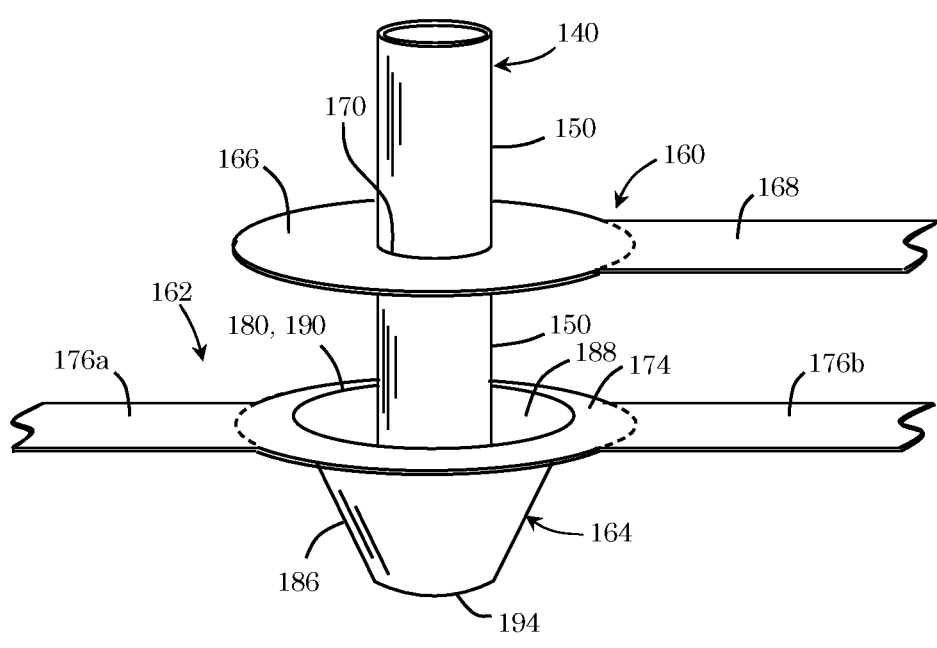
FIG. 9 is a perspective view of at least a portion of the exit conduit of FIG. 4 showing the attachment of the first and second electrical flanges to the exit conduit and the upwardly concave heating member, respectively.

FIG. 9 is a perspective view of downcomer 140 shown with first electrical flange 160 joined to the downcomer, concave heating member 164 joined to the distal end of the downcomer, and second electrical flange 162 joined to concave heating member 164. In the embodiment shown, concave heating member 164 is arranged as an upwardly concave heating member, e.g., a conical heating member.

Returning to FIG. 4, a thermally conductive material 202 can be disposed in cup-shaped volume 204 between concave heating member 164 and wall 150. However, thermally conductive material 202 should be electrically isolating (non-electrically conductive) to prevent electrically shorting across upwardly concave heating member 164. Thermally conductive material 202 can comprise a poured ceramic cement (castable), such as Ceramabond 503 available from Aremco Products, Inc. (Valley Cottage, NY), EA139 manufactured by Saint-Gobain Abrasives Incorporated, or, for example, a mixture of Ceramabond and EA139.

Thermally conductive material 202 functions to conduct heat generated by the electrical current in concave heating member 164 (between first electrical flange 160 and second electrical flange 162) to that portion of downcomer 140 in contact with thermally conductive material 202. Additionally, because thickness T2 of concave heating member 164 can be thin, thermally conductive material 202 can provide structural rigidity to the concave heating member, thereby preventing distortion or collapse of the upwardly concave heating member. The size (e.g., height, diameter, thickness) of concave heating member 164, and the magnitude of the electrical current supplied between first electrical flange 160 and second electrical flange 162 are selected to provide sufficient thermal energy to distal end 146 such that molten glass that migrates to the edge surface of distal end 146, or to an outside surface of concave heating member 164, is maintained at a temperature above the liquidus temperature of the molten glass. Thus, distal end 146, can be heated by conduction from concave heating member 164 and directly heated by wall 150 due to Joule heating of the wall.

In accordance with various embodiments, a first thermal insulating material 206 can be disposed between first electrical flange 160 and second electrical flange 162, e.g., between first body portion 166 and second body portion 174. First thermal insulating material may be, for example a ceramic fiber board (e.g. alumino-silica and/or mullite fibers and binders) such as Unifrax Fiberfrax® Duraboard® 3000 or ZIRCAR RS-100 refractory sheet manufactured by ZIRCAR Refractory Composites, Incorporated. In some embodiments, a second thermal insulating material 207 may also be positioned between first electrical flange 160 and second electrical flange 162. Second thermal insulating material 207 can be, for example, a refractory firebrick suitable for supporting the weight of insulating or other materials positioned above first electrical flange 160. Second thermal insulating material 207 can comprise alumina and/or zirconia, although other firebrick materials known in the art may be employed.

In some embodiments, a third thermal insulating material 208 can be positioned below and in contact with second electrical flange 162. Third thermal insulating material 208 can be the same material as first thermal insulating material 206, e.g., a ceramic fiber board such as Unifrax Fiberfrax® Duraboard® 3000 and/or ZIRCAR RS-100 refractory sheet. Third thermal insulating material 208 can define a passage 210 of sufficient diameter to allow a stream of molten glass issuing from distal end 146 of downcomer 140 to pass through second thermal insulating material 208 without contacting thermal insulating material 208.

A fourth thermal insulating material 212, for example a castable refractory, can surround downcomer 140. Additionally, in some embodiments, a fifth thermal insulating material 214, e.g., a refractory firebrick, can surround fourth thermal insulating material 212. Fifth thermal insulating material 214 can comprise, for example, alumina and/or zirconia, although other refractory materials may also be employed.

Components of downstream glass manufacturing apparatus 128, including any of connecting conduits 130, 136, 142, fining vessel 132, mixing apparatus 134, delivery vessel 138, downcomer 140, or electrical flanges 160, 162, or 184, may be formed from a precious metal. Suitable precious metals include platinum group metals selected from the group consisting of platinum, iridium, rhodium, osmium, ruthenium and palladium, or alloys thereof. For example, downstream components of the glass manufacturing apparatus may be formed from or include a platinum-rhodium alloy including from about 70% to about 90% by weight platinum and about 10% to about 30% by weight rhodium. However, other metals suitable for forming downstream components of the glass manufacturing apparatus can include molybdenum, rhenium, tantalum, titanium, tungsten and alloys thereof.

Downcomer 140, fourth thermal insulating material 212 and fifth thermal insulating material 214 can be supported by one or more steel structural elements 216 arranged around a periphery of fifth thermal insulating material 214.

Figure 10:
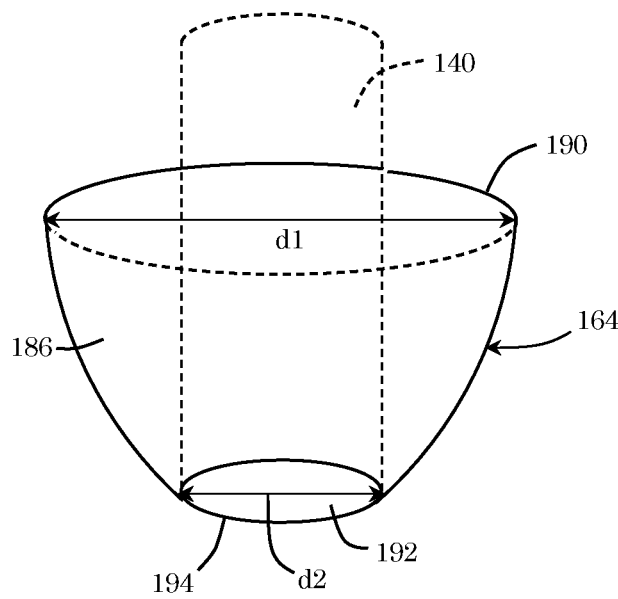
FIG. 10 is a perspective view of another concave heating member with a parabolic shape.

In further embodiments, concave heating member 164 can comprise a parabolic shape as shown in FIG. 10, resulting in a bowl-shaped volume positioned between concave heating member 164 and outer surface 156 of downcomer wall 150. However, concave heating member 164 may have other concave shapes, such as a semi-spherical shape.

Figure 11:
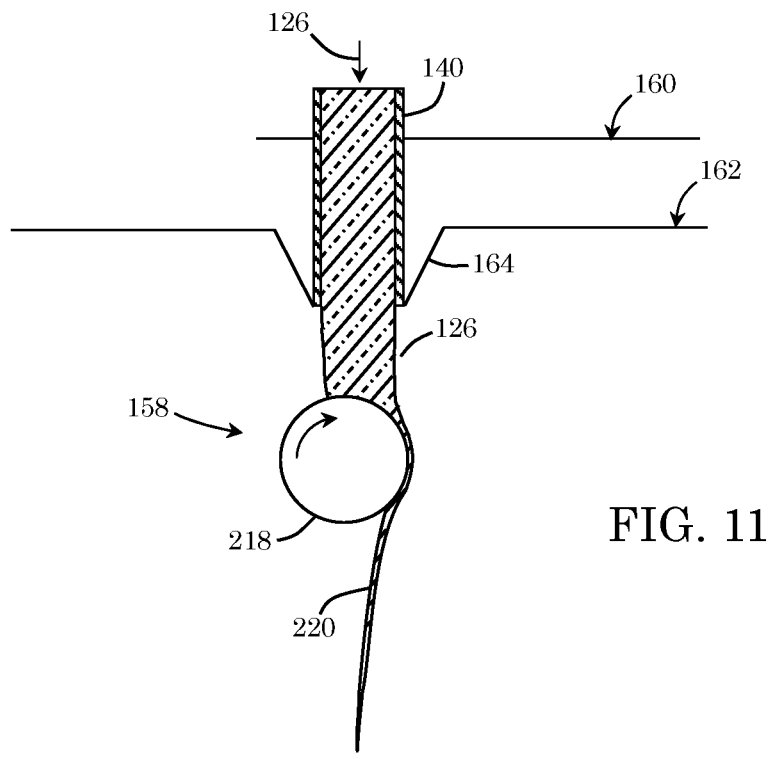
FIG. 11 is a cross-sectional view of a portion of an exemplary downcomer according to embodiments described herein, wherein the downcomer is shown delivering molten glass forming material to an exemplary forming apparatus comprising a rotating forming roll.
Figure 12:
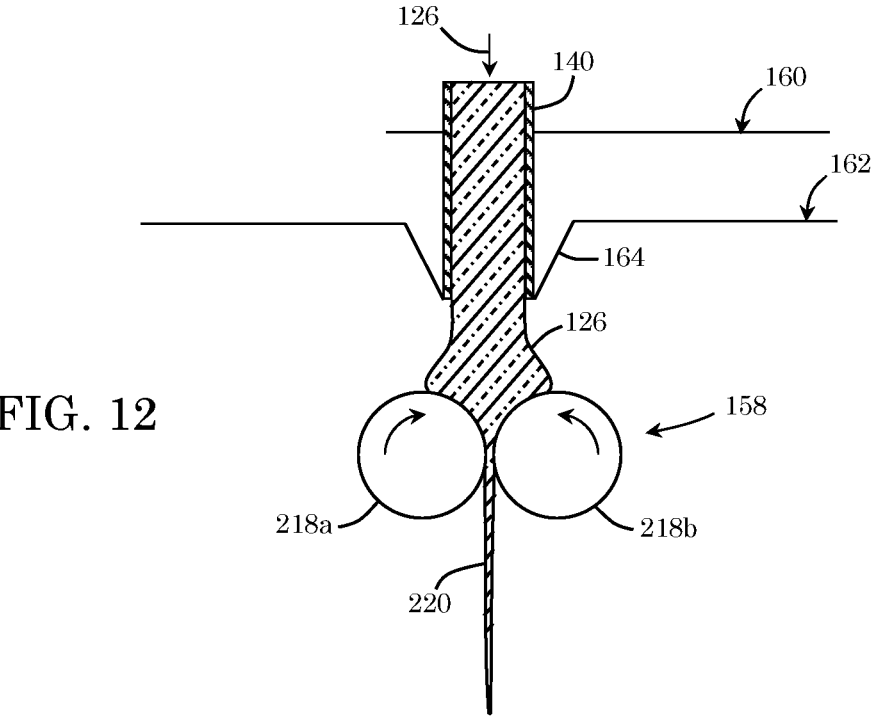
FIG. 12 is a cross-sectional view of a portion of another exemplary downcomer according to embodiments described herein, wherein the downcomer is shown delivering molten glass forming material to a forming apparatus comprising a pair of counter-rotating forming rolls.

FIG. 3 further shows an example embodiment of a forming apparatus 158 comprising one or more forming rolls 218 arranged to produce a ribbon of glass 220. For example, in some embodiments, as illustrated in FIG. 11, forming apparatus may comprises a single forming roll 218 arranged to rotate about an axis of rotation, wherein molten glass 126 is delivered to a top portion of forming roll 218 by downcomer 140. The molten glass rotates with the forming roll and releases near a bottom of forming roll 218 as glass ribbon 220. In another embodiment, shown in FIG. 12, the molten glass is delivered by downcomer 140 between a first rotating forming roll 218a and a second counter-rotating forming roll 218b spaced apart from first rotating forming roll 218a. The molten glass is pressed between the two counter-rotating forming rolls and emerges from between the two counter-rotating forming rolls as glass ribbon 220.

A concave heating member need not be used in conjunction with a conduit intended to deliver molten glass to a forming apparatus. For example, various vessels (or conduits) in a glass manufacturing apparatus may require draining at some point time their operation. Accordingly, these vessels may be provided with drain tubes, and these drain tubes may be fitted with a concave heating member as described herein used in conjunction with an electrical flange attached thereto as described in respect of the foregoing downcomer. Moreover, in some embodiments, a concave heating member similar to the concave heating member described herein may be used at any location on a conduit where additional heat energy is needed, and therefore is not restricted to being upwardly concave (e.g., joined to a vertically arranged conduit or tube), but may be oriented in other direction. Additionally, the concave heating member is not restricted to the end of a tube or conduit but may be arranged to surround a portion of an intermediate portion of tube or conduit.

While various embodiments have been described in detail relative to certain illustrative and specific examples thereof, the present disclosure should not be considered limited to such, as numerous modifications and combinations of the disclosed features are possible without departing from the scope of the following claims.

What it claimed is:

1. A glass manufacturing apparatus, comprising:
   a vessel configured to convey molten glass;
   a conduit extending downward from the vessel, the conduit comprising a distal end comprising a concave heating member joined thereto:
   a first electrical flange joined to the conduit;
   a second electrical flange joined to the concave heating member; and
   a thermally conductive material disposed in a volume defined between the concave heating
   member and a wall of the conduit,
   wherein a thickness of the conduit is greater than a thickness T2 of the concave heating member,
   wherein the concave heating member comprises a major end with a first diameter and a minor end with a second diameter less than the first diameter, and the second electrical flange is joined to an upper rim of the major end, and
   wherein the second electrical flange comprises a body portion with an inner edge defining an interior opening, the inner edge joined to the upper rim of the concave heating member about a circumference of the major end.

2. The glass manufacturing apparatus of claim 1, wherein the concave heating member comprises a truncated cone.

3. The glass manufacturing apparatus of claim 1, further comprising a third electrical flange electrically connected to the conduit between the first electrical flange and the vessel.

4. The glass manufacturing apparatus of claim 1, wherein the concave heating member intersects the conduit orthogonally.

5. The glass manufacturing apparatus of claim 1, wherein the conduit, the concave heating member, and the second electrical flange comprise platinum.

6. The glass manufacturing apparatus of claim 1, wherein the conduit comprises a drainpipe of the vessel.

7. The glass manufacturing apparatus of claim 1, wherein the concave heating member is an upwardly concave heating member.

8. A glass manufacturing apparatus, comprising:
   a molten glass delivery vessel;
   a conduit extending from the molten glass delivery vessel, the conduit comprising a proximal end joined to the molten glass delivery vessel and a distal end with a conical heating member extending from the distal end toward the molten glass delivery vessel;

a first electrical flange joined to the distal end of the conduit;

a second electrical flange joined to the conical heating member; and a ceramic cement disposed in a volume defined between the concave heating member and a wall of the conduit, wherein a thickness T1 of the conduit is greater than a thickness T2 of the concave heating member, wherein the conical heating member comprises a major end with a first diameter and a minor end with a second diameter less than the first diameter, and the second electrical flange is joined to an upper rim of the major end, and wherein the second electrical flange comprises a body portion with an inner edge defining an interior opening, the inner edge joined to the upper rim of the conical heating member about a circumference of the major end.

9. The glass manufacturing apparatus of claim 8, wherein the conduit, the conical heating member, and the second electrical flange comprise platinum.

10. The glass manufacturing apparatus of claim 9, wherein the conical heating member comprises an arcuate neck portion orthogonally joined to the distal end.

* * * * *